United States Patent Office 3,184,320
Patented May 18, 1965

3,184,320
CERAMIC PROTECTIVE COATING COMPOSITION
Harold J. Michael, Columbus, Ohio, assignor to
North American Aviation, Inc.
No Drawing. Filed Dec. 8, 1964, Ser. No. 416,885
10 Claims. (Cl. 106—48)

The instant application is a continuation-in-part of pending application Serial No. 135,150, filed August 31, 1961, now abandoned.

This invention relates generally to ceramic protective coatings, and particularly concerns ceramic protective coating compositions which develop improved physical characteristics and improved performance capabilities and which may be advantageously used to protect metal surfaces and the like against oxidation and corrosion, especially at elevated temperatures.

The invention disclosed and claimed herein involves a ceramic protective coating which is essentially comprised of a refractory and three separately formulated high-temperature glass frits having prescribed chemical (although not necessarily composition) characteristics, such constituents being combined in preferred proportions. The three separately formulated glass frits are further individually selected according to certain physical properties and are basically characterized in this respect as having a low thermal expansion characteristic, a medium thermal expansion characteristic, and a high thermal expansion characteristic, respectively. The ceramic protective coating of this invention may be modified by the proper addition of a metal to develop an improved resistance to spalling characteristic. Also, the ceramic protective coating of this invention may be modified by the addition of certain oxides to selectively improve other specific physical and performance characteristics.

As used in this application, the term "low thermal expansion glass frit" (and similar terms) refers to a high-temperature glass frit material having a coefficient of thermal expansion in the approximate range of from $3 \times 10^{-6}$ to $5 \times 10^{-6}$ inches per inch per degree Fahrenheit. The term "medium thermal expansion glass frit" (and like terms) are used in this application to reference a high-temperature glass frit material which has a coefficient of thermal expansion in the approximate range of from $5 \times 10^{-6}$ to $7 \times 10^{-6}$ inches per inch per degree Fahrenheit. The term "high thermal expansion glass frit" refers to a high-temperature glass frit having a coefficient of thermal expansion in the approximate range of from $7 \times 10^{-6}$ to $10 \times 10^{-6}$ inches per inch per degree Fahrenheit.

An important object of this invention is to provide a ceramic protective coating which includes separately formulated high-temperature glass frits, each having the desired chemical characteristics and further having a low, medium, and high thermal expansion characteristic, respectively, combined in proper proportions to develop an improved thermal expansion characteristic match as to metal surfaces to which the coating is applied.

Another important object of this invention is to provide a ceramic protective coating which includes separately formulated high-temperature glass frits, each having the desired chemical characteristics and further having a low, medium, and high thermal expansion characteristic, respectively, combined in proper proportions to develop improved resistance to failure by thermal shock.

Another object of this invention is to provide a ceramic protective coating which includes separately formulated high-temperature glass frits, each having the desired chemical characteristics and further having a low, medium, and high thermal expansion characteristic, respectively, combined in proper proportion to develop improved adhesion to metal surfaces particularly metal surfaces treated with nickel and chromium or chromium-containing alloys.

Another object of this invention is to provide a ceramic protective coating which includes separately formulated high-temperature glass frits, each having the desired chemical characteristics and further having a low, medium, and high thermal expansion characteristic, respectively, combined in proper proportions to develop an improved thermal endurance capability at elevated temperatures.

Another object of this invention is to provide a ceramic protective coating which includes separately formulated high-temperature glass frits, each having the desired chemical characteristics and further having a low, medium, and high thermal expansion characteristic, respectively, combnied in proper proportions, and which may be readily modified by inclusion of a metal additive to develop improved resistance to spalling caused by bending or torsion.

Another object of this invention is to provide a ceramic protective coating which includes separately formulated high-temperature glass frits, each having the desired chemical characteristics and further having a low, medium, and high thermal expansion characteristic, respectively, combined in proper proportions, which may be readily modified by the inclusion of a metal additive to develop improved resistance to spalling caused by thermal and mechanical stresses.

Another object of this invention is to provide a ceramic protective coating which includes separately formulated high-temperature glass frits, each having the desired chemical characteristics and further having a low, medium, and high thermal expansion characteristic, respectively, combined in proper proportions to develop reduced porosity and increased protection capability against oxidation and corrosion, especially at elevated temperatures.

A still further object of this invention is to provide a ceramic protective coating which includes separately formulated high-temperature glass frits, each having the desired chemical characteristics and further having a low, medium, and high thermal expansion characteristic, respectively, combined in proper proportions to develop an improved dielectric property.

Another object of this invention is to provide a ceramic protective coating which includes separately formulated high-temperature glass frits, each having the desired chemical characteristics and further having a low, medium, and high thermal expansion characteristic, respectively, combined in proper proportions, and which may be readily modified by the inclusion of a suitable oxide to adjust thermal expansion, refractoriness, and other coating physical properties.

The ceramic protective coating of this invention also obtains important advantages as to resistance to chemical attack, ease of application to metal surfaces, maintainability, and economy.

Other objects and advantages of this invention will become apparent during consideration of the following description.

APPLICATION

The ceramic protective coating invention described herein has particular utility with respect to products which are fabricated of corrosion-resistant alloys. Such corrosion-resistant alloys include stainless steels, nickel-base alloys, chromium-base alloys, and the like. Specific examples of corrosion-resistant alloys to which this invention has been applied includes Type 300 series stainless steels, Type 400 series stainless steels, and Inconel, René 41, and Hastalloy-X materials. Corrosion-resistant alloys are actually corrosion-resistant in a limited sense. At low and intermediate temperatures, that is temperatures extending to approximately 1500° F., resistance to oxidation and corrosion is excellent. At temperatures from approximately 1500° F.–1600° F. upwards and in environments containing oxygen, steam, engine exhaust gases, or other corrosion-causing constituents, such corrosion-resistant alloys are generally subject to appreciable oxidation and/or corrosion.

The ceramic protective coating invention described herein also has utility with respect to parts fabricated of steel, iron, copper, or certain exotic metals, and to temperature-resistant parts fabricated of graphite and the like having a subsequently applied oxidation-susceptible metal surface, if the to-be-protected surface areas of each such part is provided with a proper intermediate film to develop improved coating adhesion. In general, such intermediate film involves the application of an overlay comprised essentially of nickel and chromium to the part in contacting and adhering relation to to-be-protected surface areas. In the event that environment temperatures which are only intermediate in magnitude are anticipated as to the to-be-coated part (temperatures of from approximately 900° F. to approximately 1500° F.), the overlay may be comprised essentially only of chromium. Details regarding methods for developing the necessary intermediate film on oxidation and corrosion-susceptible surfaces are provided in the above-referenced co-pending application and also in my co-pending application Serial No. 108,263, filed May 8, 1961.

Numerous different parts have been provided with the ceramic protective coating of this invention. Such parts include quartz lamp reflectors fabricated of Type 321 stainless steel, a sliding surface clamp employed in a high-performance aircraft air conditioning system and fabricated of Type 304 stainless steel, support grid brazing fixtures fabricated of Inconel and used in retorts for brazing aircraft honeycomb core panels constructed of precipitation-hardening alloy steel, and aircraft exhaust tail cones manufactured of N155 corrosion-resistant alloy. In each instance, the physical properties and performance capabilities developed in the coated part through use of this ceramic protective coating invention obtained important advantages and results in comparison to known ceramic protective coatings. Details regarding use of the ceramic protective coating of this invention on corrosion-susceptible parts made of steel, iron, copper, plated graphite, or the like and having a suitable intermediate overlay to develop improved resistance to corrosion at intermediate and elevated temperatures are provided in the above-referenced copending applications.

PRE-TREATMENT

It is recommended that the metal surfaces of the component parts to be processed in accordance with this invention be pretreated by suitable cleaning and abrading. Surfaces having oils or lubricants present thereon are preferably cleaned utilizing conventional solvent materials, or vapor degreasing techniques, or emulsion cleaning agents. If only very light oils or fingerprints are present on the metal surface, cleaning may be accomplished using known commercial alkaline cleaners. Afterwards, the part should be rinsed and dried.

It is also recommended that the cleaned metal surface then be abraded using conventional abrasives. Sand blasting may be accomplished by delivering No. 40 mesh sharp sand by air blast at approximately 90 to 120 pounds per square inch air pressure uniformly over the surface of the to-be-processed part. As an alternate, fused alumina grit ranging from No. 60 mesh to No. 321 mesh may be substituted for sand. It is preferred that the air blast delivery pressure be kept to a minimum to avoid warpage when abrading thin, light-weight, or sheet-like base materials.

If component parts fabricated of thin, sheet-like corrosion-resistant alloys cannot be subjected to the above-described abrading process or to an equivalent abrading operation, a conventional acid pickling or etching technique may be employed as a substitute procedure.

In the event the ceramic protective coating invention described herein is to be applied to component parts having surfaces which are readily susceptible to oxidation and corrosion at temperatures of from approximately 900° F. upwards, it is only necessary to clean and abrade the to-be-coated surface areas prior to application of the overlay film referenced above.

PROCESS STEPS

The properly pre-treated metal surface of the base part is next subjected to at least two process steps. In general, such steps relate to: (1) providing the ceramic protective coating composition of this invention in slip form to the to-be-coated surfaces of the base part and in a suitable manner such as by brushing, spraying, dipping, sloshing, or the like, and (2) fusing the so-applied coating slip to the base part by firing to maturity.

The ceramic protective coating of this invention is basically comprised of three separately formulated high-temperature glass frits, each having the desired chemical characteristics and further having a low, medium, and high thermal expansion characteristic, respectively, combined in proper proportions and with a refractory oxide. The ceramic protective coating of this invention typically also includes a clay or clay-like suspension agent which materially facilitates application of the coating when it is mixed with sufficient water to form a suitable slip. The hereinafter detailed coating slip is preferably dried after application to the to-be-protected surfaces and before firing; it is preferably provided on the part to a depth which will result in a final fired ceramic protective coating thickness of 0.001″ to 0.002″.

The applied coating is afterwards fused to the base part to-be-protected surfaces by furnace firing in an air atmosphere at temperatures of from approximately 1700° F. to 2200° F. The firing schedule actually selected depends upon the particular composition of the coating material. Conventional furnace equipment and firing practices are employed to carry out the coating firing operation.

Detailed information with respect to the composition of the ceramic protective coating of this invention is provided in the description which follows. In general, the coating composition may be modified within limits to meet the requirements of particular applications. Coating characteristics relating to required application technique, firing temperature, flow property, and the like may be developed or adjusted using formulation techniques which are generally known to those skilled in the art.

CERAMIC PROTECTIVE COATING COMPOSITION

The glass frit-refractory protective coating which comprises this invention may be developed through use of a slip having, by weight:

| | Parts |
|---|---|
| Mixed glass frits | 100 |
| Refractory oxide | 2–100 |
| Suspension agent | ½–10 |
| Water | 40–70 |

Such slip is preferably applied to the metallic base or metallic surface which is to be protected against corrosion and high temperatures by either brushing, spraying, dipping, or sloshing. The lower limit for parts by weight of refractory oxide contained in the protective coating and contained in the slip is established with due consideration to the amount of refractory material contained in the glass frit. Detailed information will be provided hereinafter with respect to the glass frit, refractory oxide, and suspension agent portions of the above-indicated protective coating slip. Such information will establish a better understanding as to the high-temperature glass frit-refractory type of ceramic coatings which I preferably employ in the practice of this invention.

(I) Glass frits

The high-temperature glass frits which are separately formulated and employed in the practice of this invention are selected for their chemical characteristics of being both fluorine-free and of low (or zero) alkali metal oxide content and each include, in combination, glass-forming ingredients and a refractory additive. As used in this application, the terms "low alkalinity" and "low alkali metal oxide content" relate to a glass frit wherein the total alkali metal oxides included in the composition is less than approximately 12% on a parts by weight basis. Each separately formulated glass frit is also compounded to provide, in addition to such chemical characteristics, controlled physical properties relating to softening point temperature, fusion flow, and thermal expansion coefficient. As previously suggested, the separately formulated glass frits employed in the practice of this invention are identified in terms of a thermal expansion coefficient that may be categorized as low, medium, or high in comparative value, respectively. Such identifications are primarily for convenience. Formulation details regarding so-identified glass frits considered as representative to the practice of this invention are provided in the Example G, Example H and Example J glass frit compositions which follow.

As to prescribed control of the required physical properties for the high-temperature glass frits utilized in the practice of this invention, additional comments are helpful. First, such frits must each have a softening point temperature which is in the range of approximately 1100° F. to 1250° F. Different temperatures occur within that range as a consequence of the different specific formulations involved in the practice of the invention. Such temperature values have been determined by use of an automatic recording thermal expansion dilatometer in accordance with conventional laboratory practice while heating the specimen glass over a range from room temperature to the softening or deformation point.

Second, in controlling the fusion flow property of the different high-temperature glass frits, attention must be given to the manner of measuring that property. Basically, the following technique is adopted as the standard for the measurement. A standard 10 gram dry sample of the glass frit is crushed to pass a 40 mesh screen and to remain upon an 80 mesh screen. The sample is mixed with a small quantity of organic binder and diluent sufficient to develop a cohesive shape when prepared in a cylindrical die of 1" diameter using approximately 2,000 pounds per square inch pressure. The resulting prepared 1" diameter button is dried, placed upon a stainless steel panel (approximately 4" x 4" x 0.050"), and fired at 1800° F. for 15 minutes allowing the specimen to fuse and flow. The fired and flowed frit button is subsequently cooled to room temperature to solidify. The degree of flow of the fired frit is measured on the basis of the ratio of the diameter of the flowed material to the original button diameter but preferably is expressed as a percentage excess over 100%. Thus, a 1" diameter button having an average fired and solidified diameter of 1½" has a diameter ratio of 1.5 (150%) and fusion flow value of 50%. The flowed dimensions are established as the average of two dimensions taken at right angles to each other. The high-temperature glass frits indicated herein as having low, medium, and high thermal expansion coefficient characteristics are required to have such fusion flow values in the ranges given below in order for the effective practice of this invention:

| Frit thermal expansion characteristic identification: | Fusion flow value, percent |
|---|---|
| Low | 7–22 |
| Medium | 38–48 |
| High | 60–75 |

The thermal expansion coefficient property selected for each of the required separately formulated high-temperature glass frits should fall within the different ranges detailed in the introduction portion of the instant specification. Basically, the frits should each be within a different one of the ranges given below:

| Frit thermal expansion characteristic identification: | Value range |
|---|---|
| Low | 3–5 |
| Medium | 5–7 |
| High | 7–10 |

The above values are expressed in terms of $10^{-6}$ inches per inch per degree Fahrenheit.

A representative cross-section of refractory oxide additives which may be combined with the glass-forming ingredients to establish a suitable frit inclues the oxides of: nickel, chromium, aluminum, silicon, titanium, zirconium, iron, manganese, molybdenum, cobalt, cerium, niobium, vanadium, and tin. The percent weight of refractory additive depends upon the degree of solubility of the particular oxide in the basic glass system. For example, the oxides of titanium, iron, manganese, and niobium are comparatively soluble in the glass and function to add thermal endurance qualities to the protective coating without developing excessive refractoriness. The oxides of cerium and cobalt are moderately soluble in the basic glass and cannot be added in large quantities without effecting a loss of flow. The oxides of nickel, chromium, aluminum, and zirconium are least soluble in the glass and small quantity additions thereof operate to develop refractoriness, heat resistance, and reduced flow characteristics in the resulting glass frit. Although the above-discussed oxides may be employed to adjust basic physical charactersitics, for simplification purposes it is preferred that the oxide of aluminum alone be used as the frit refractory additive.

In the following frit examples $Al_2O_3$ only is the glass frit refractory oxide additive; silica is used in each glass frit formulation as a glass-forming ingredient. Specific oxide combinations which develop glass frits having a desired individual high, medium, or low thermal expansion characteristic are disclosed in the following Example G, H, and J formulations, respectively.

EXAMPLE G.—GLASS FRIT COMPOSITION
[Parts by weight]

| Ingredient | Range | Preferred amount |
|---|---|---|
| $SiO_2$ | 42.0–54.0 | 48.0 |
| $B_2O_3$ | 2.0– 6.0 | 4.0 |
| $Al_2O_3$ | 0.5– 2.0 | 1.0 |
| $ZnO$ | 6.0–12.0 | 9.0 |
| $K_2O$ | 6.0– 8.0 | 7.0 |
| $Na_2O$ | 0.5– 2.0 | 1.0 |
| $BaO$ | 21.0–39.0 | 30.0 |

EXAMPLE H.—GLASS FRIT COMPOSITION
[Parts by weight]

| Ingredient | Range | Preferred amount |
|---|---|---|
| $SiO_2$ | 38.0–43.0 | 40.0 |
| $B_2O_3$ | 4.0– 8.0 | 6.0 |
| $Al_2O_3$ | 2.0– 4.0 | 3.0 |
| $ZnO$ | 6.0–12.0 | 9.0 |
| $BaO$ | 34.0–50.0 | 42.0 |

EXAMPLE J.—GLASS FRIT COMPOSITION
[Parts by weight]

| Ingredient | Range | Preferred amount |
|---|---|---|
| $SiO_2$ | 77.0–84.0 | 81.0 |
| $B_2O_3$ | 9.0–17.0 | 13.0 |
| $K_2O + Na_2O$ | 2.0–5.0 | 3.8 |
| $Al_2O_3$ | 1.0–3.0 | 2.2 |

Batching ingredients for the above different frit oxide compositions are given below.

The preferred high thermal expansion glass frit composition set forth as Example G may be developed by smelting the following glass frit batching ingredients in the indicated amounts by weight at 2500° F. to 2650° F. until free of bubbles and afterwards quenching the molten composition:

| | Parts |
|---|---|
| Silica | 426.0 |
| Barium carbonate | 341.0 |
| Potassium | 91.5 |
| Zinc oxide | 80.0 |
| Boric oxide | 35.5 |
| Soda ash (anhydrous) | 15.0 |
| Aluminum hydrate | 11.0 |

The softening point temperature of this frit, as fused, is approximately 1130° F. The coefficient of thermal expansion for this Example G—Glass Frit is approximately $8.4 \times 10^{-6}$ inches per inch per degree Fahrenheit measured over the range of room temperature to softening point. Fusion flow value for the frit is 67.6% approximately.

The preferred medium thermal expansion glass frit composition set forth as Example H may be developed by smelting the following glass frit batching ingredients in the indicated amounts by weight at 2500° F. to 2650° F. until free of bubbles and afterwards quenching the molten composition:

| | Parts |
|---|---|
| Barium carbonate | 480.0 |
| Silica | 356.0 |
| Zinc oxide | 80.0 |
| Boric oxide | 53.0 |
| Aluminum hydrate | 31.0 |

The softening point temperature of this material is approximately 1217° F. The coefficient of thermal expansion for this Example H—Glass Frit is approximately $6.8 \times 10^{-6}$ inches per inch per degree Fahrenheit measured over the range of room temperature to softening point. Fusion flow value for this particular frit was determined to be 43.8%.

The preferred low thermal expansion glass fit composition set forth as Example J may be developed by smelting the following glass frit batching ingredients in the indicated amounts by weight at 2500° F. to 2650° F. until free of bubbles and afterwards quenching the molten composition:

| | Parts |
|---|---|
| Silica | 752.0 |
| Nepheline-syenite | 93.0 |
| Anhydrous borax | 80.0 |
| Boric oxide | 75.0 |

The softening point temperature of this material was determined to be 1166° F. by test. The coefficient of thermal expansion for this Example J—Glass Frit is approximately $3.2 \times 10^{-6}$ inches per inch per degree Fahrenheit over the range of room temperature to softening point. Fusion flow value is approximately 13.0%. The Example J frit may be more conveniently smelted if a temperature of 2850° F.–2900° F. is employed. However, smelting equipment for the higher temperature is not always available.

The above preferred glass frit compositions are considered as representative of the formulations that would be resorted to or used by persons skilled in the art to develop the glass frit properties and characteristics required by the practice of this invention. Again, each of the necessary high-temperature glass frits must chemically be free of fluorine and must have a low (or zero) alkalinity. Each of the required frits must have a softening point temperature in the range of approximately 1100° F. to 1250° F. The three different required high-temperature glass frits must have fusion flow values, as measured by the hereinbefore detailed procedures, in the ranges of 7% to 21%, 38% to 48%, and 60% to 75% for the low, medium, and high thermal expansion coefficient characteristic identifications, respectively. As to the thermal expansion characteristics of the different frits, the ranges of 3 to 5, 5 to 7, and 7 to 10 for thermal expansion coefficients based on $10^{-6}$ inches per inch per degree Fahrenheit should apply to the low, medium, and high characteristic categories, respectively. Other known compositions for glass frits will produce equivalent properties and will function in this invention in the manner of the detailed formulations. Accordingly, the above glass frit compositions are to be considered only as examples; in this invention the selection of the different frits should be on the basis of the required physical properties and chemical characteristics and not primarily on the basis of formulation features.

(II) *Refractory oxide*

The refractory material selected and used as a mill addition to the ceramic protective coating slip is generally comprised of one or more of the refractory oxides identified above in connection with the description of the glass frit refractory additive. The refractory material is mill-added to the slip to produce the desired firing temperature, maturing temperature, and coefficient of thermal expansion-contraction to "fit" the base metal or metal surface of the processed product. The amount of refractory oxide included in the slip composition depends upon the refractoriness of the glass frit used in the slip. For instance, a comparatively high percentage of refractory oxide melted into the basic glass increases the frit melting temperature, reduces its flow characteristics at the maturing temperature desired, and would be used with relatively less additional refractory, if any, in the slip mill charge. On the other hand, a glass frit having a low percentage of refractory additive melted into the basic glass would have a comparatively low melting temperature and would have an increased flow characteristic at the desired maturing temperature. A comparatively larger percentage of refractory material would be combined with such a glass frit to comprise the slip composition.

Generally, I prefer that the ceramic protective coating contains a proper total quantity of refractory whereby sufficient flow is developed during firing to completely eliminate coating porosity within the first two or three minutes of the firing operation.

The following refractory oxide additive is essentially only a mixture of refractory oxides and may be employed advantageously in the ceramic protective coating slip formulation which is hereinafter described in connection with an Example L slip formulation. For identification purposes, this particular refractory oxide mixture is designated Example K and has the following composition:

EXAMPLE K—REFRACTORY
[Parts by weight]

| Ingredients: | Preferred amount |
|---|---|
| NiO | 16.7 |
| $Cr_2O_3$ | 16.7 |
| $SiO_2$ | 66.6 |

(III) *Suspension agent*

The above-identified glass slip typically includes a suspension agent to maintain proper dispersion of the glass frits and refractory oxide in either a water or oil vehicle. It is generally preferred that either enameler's clay or bentonite be used as a suspension agent in connection with this invention. Normally, a relatively lesser quantity of bentonite is required if such is used in place of enameler's clay. A good grade of purified bentonite, as commonly used with porcelain enamel materials is recommended. If enameler's clay is employed, a water-washed, air-floated enameler's grade of clay having moderate to high "set" is preferred.

(IV) Slip formulations

The descriptive information which follows provides details with respect to three different ceramic protective coatings which each incorporate the features of this invention. The different coating compositions are designated as Example L, Example M, and Example N coating. Each composition is described by a slip formulation and includes separately formulated glass frits having a low, a medium, and a high thermal expansion characteristic, respectively, and a refractory additive. The three different coating compositions are suited to different applications. From the standpoint of application to corrosion-resistant alloy parts and steel or iron-like parts coated with an intermediate adhesion-improving overlay, the slip formulations disclosed by Example L have found greatest use. The various slip formulations which may be developed within the limits set forth in Example L are each characterized as having a medium thermal expansion characteristic for the composite ceramic protective coating. Details for formulating ceramic protecting coating slips which may be applied and fired to maturity to develop protective coatings having a high thermal expansion characteristic or a low thermal expansion characteristic are provided in Examples M and N, respectively. The formulations suggested by Example M have found application to component parts made of copper and copper alloys provided with the previously-discussed intermediate overlay. The slip formulation suggested by Example N have found application to component parts made of graphite and provided with an intermediate, readily oxidizable metal surface that is protected by a suitable chromium and nickel overlay. The mill formulations for developing Examples L, M, and N coating slips are as follows:

EXAMPLE L.—PROTECTIVE COATING SLIP
[Parts by weight]

| Ingredients | Range | Preferred amount |
| --- | --- | --- |
| Low thermal expansion glass frit | 35.0–40.0 | 37.5 |
| Medium thermal expansion glass frit | 10.0–15.0 | 12.5 |
| High thermal expansion glass frit | 35.0–40.0 | 37.5 |
| Example "K" refractory | 12.0–18.0 | 15.0 |
| Annealed nickel powder (−325 mesh) | 7.0– 8.0 | 7.5 |
| Enameler's clay | 4.0– 7.0 | 5.0 |
| Distilled water | 50.0–60.0 | 60.0 |

The above-listed slip batching ingredients are preferably milled to a trace on a 325 mesh screen (relative to a 100 gram sample) prior to application.

EXAMPLE M.—PROTECTIVE COATING SLIP
[Parts by weight]

| Ingredients | Range | Preferred amount |
| --- | --- | --- |
| Low thermal expansion glass frit | 35.0–40.0 | 37.5 |
| Medium thermal expansion glass frit | 10.0–15.0 | 12.5 |
| High thermal expansion glass frit | 35.0–50.0 | 37.5 |
| Titanium dioxide | 5.0–20.0 | 10.0 |
| Nickel monoxide | 2.0– 3.0 | 2.5 |
| Chromic oxide | 2.0– 3.0 | 2.5 |
| Annealed nickel powder (−325 mesh) | 7.0– 8.0 | 7.5 |
| Enameler's clay | 3.0–10.0 | 5.0 |
| Distilled water | 30.0–70.0 | 60.0 |

EXAMPLE N.—PROTECTIVE COATING SLIP
[Parts by weight]

| Ingredients | Range | Preferred amount |
| --- | --- | --- |
| Low thermal expansion glass frit | 50.0–80.0 | 65.0 |
| Medium thermal expansion glass frit | 10.0–15.0 | 12.5 |
| High thermal expansion glass frit | 10.0–15.0 | 12.5 |
| Silica | 10.0–15.0 | 12.5 |
| Annealed nickel powder (−325 mesh) | 7.0– 8.0 | 7.5 |
| Enameler's clay | 5.0–10.0 | 7.5 |
| Distilled water | 50.0–70.0 | 60.0 |

The slip ingredients listed above in connection with Examples M and N are milled in the manner of the slip ingredients identified in connection with Example L. The preferred amounts of Low, Medium, and High Thermal Expansion Frits indicated in connection with Examples L, M, and N formulations given above are based specifically on the Examples J, H, and G glass frit compositions previously detailed.

In the Example M protective coating slip the refractory oxide portion is comprised of titanium dioxide, nickel monoxide, and chromic oxide. Nickel monoxide and chromic oxide are included in the composition to develop increased refractoriness and an increased thermal expansion coefficient in the resultant coating. Aluminum oxide, if added to the ceramic coating, would perform a similar function. Titanium dioxide is included in the composition to develop increased thermal expansion without increasing the refractoriness quality of the material. The refractory oxide ceria may also be used to achieve the function of titanium dioxide.

In the Example N protective coating slip silica is included as the refractory oxide to develop a coating having a reduced thermal expansion coefficient. Zinc oxide may be used to develop a similar low thermal expansion characteristic without increasing the refractoriness quality of the coating.

Each of the slip formulations given above indicates that powdered nickel is included as an additive. Such material, as is well-known in the art, functions to develop increased resistance to spalling caused by mechanical or thermal stresses. In practicing my invention I prefer that the powdered nickel metal additives be annealed and reduced to −325 mesh. Metal powder particles should not be in excess of 74 microns in particle size.

Another suitable high thermal expansion glass frit which has been used in the practice of this invention is comprised of 61.4 parts (by weight) of lead oxide (PbO) smelted with 7.1 parts of aluminum oxide ($Al_2O_3$) and 31.5 parts of silicon dioxide ($SiO_2$). This particular frit has a coefficient of thermal expansion of $8.1 \times 10^{-6}$ inches per inch per degree Fahrenheit and is particularly useful in slip formulations having a comparatively large proportion of low expansion glass frit to improve firing fluidity and thereby minimize resulting pinholes.

The above examples establish that the ceramic protective coating of this invention preferably includes separately formulated frits and refractory, together with a suitable suspension agent and water for facilitating application, combined in the following ratio:

| Ingredient | Range |
| --- | --- |
| Low thermal expansion glass frit | 35.0–80.0 |
| Medium thermal expansion glass frit | 10.0–15.0 |
| High thermal expansion glass frit | 10.0–50.0 |
| Refractory oxides | 9.0–26.0 |

The range given is on a parts by weight basis. To formulate a suitable slip, from 3 to 10 parts suspension agent and from 50 to 70 parts water are added to the basic coating ingredients. It is believed that the preferred limits with respect to incorporated refractorp oxide, suspension agent, and water may be extended somewhat to also obtain improved results in certain specific applications.

APPLICATION EXAMPLES

The ceramic protective coating invention of this application has been utilized in numerous instances to produce new and unexpected results in terms of coating performance. The advantages associated with the claimed coating composition relate to such qualities as thermal endurance at elevated temperatures, improved adhesion to underlying nickel-chromium metals, high resistance to failure caused by thermal shock, resistance to spalling caused by bending, torsion, or thermal stress, improved dielectric properties, and the like. Examples of specific uses of the composition are given below.

A clamp component fabricated of Type 321 stainless steel and manufactured for use in a high-performance aircraft conditioning system was first cleaned and abraded in accordance with the procedures outlined under the heading Pre-Treatment. The clamp component, which was made of 0.040" thick material, was coated with a sufficient quantity of the preferred protective coating slip of Example L to produce a fired thickness of approximately 0.002". The specifically preferred slip was fired at 1800° F. for seven minutes to develop coating maturity. In subsequent tests it was determined that the Porcelain Enameling Institute adherence method index for the coating ranged from 85 to 100%. Applications of the coating to thicknesses up to 0.003" are capable of resisting 360° torsion stresses (on 0.040" thick metal) using the standard Porcelain Enameling Institute torsion testing method.

Boiler plate parts provided with the preferred cleaning and abrading pre-treatment and provided with a nickel-chromium overlay to a depth of approximately 0.0003" using sequential electro-deposition methods were also coated with the composition of this invention. The specific composition employed corresponded to the preferred specific formulation given in connection with Example L. Application of the coating slip to the part was by a spraying technique and included the covering of weld joints. The applied slip, after suitable drying, was fired to maturity at a temperature of 1800° F. to 1850° F.

The coated parts were subjected to ten repeated cycles wherein each part was heated to a temperature of 1700° F. to 1750° F. and immediately quenched in tap water at room temperature. In addition, the parts were continuously maintained in an air atmosphere at a temperature of at least 1700° F. for over 1,000 hours. There was no detectable failure of the high-temperature ceramic protective coating and no corrosion or oxidation of the base metal protected thereby. The best known conventional ceramic protective coating applied to such parts was capable of less than 100 hours endurance at the 1700° F. temperature.

The preferred coating of Example L was also applied to hanger brackets mounted in a steam boiler for supporting tube components. Such hanger brackets were fabricated of cast Series 400 stainless steel. The preferred ceramic protective coating composition of Example L was applied to a thickness of approximately 0.002" and fired to maturity at 1800° F. over a 35 minute period. The extended firing period was necessitated by the mass of the bracket casting. After several months' use in connection with normal boiler operation, the coated bracket was inspected and observed to not have suffered any surface deterioration of coating or metal. A state-of-the-art ceramic protective coating applied to the same part in a conventional manner did not offer the protection against corrosion which was obtained through use of this invention.

A protective coating slip formulated in accordance with Example M to include the preferred amounts of Examples J, H, and G glass frits has been utilized advantageously in connection with the protection of copper bars. The coated bar was first provided with proper abrading and cleaning pre-treatment and was also provided with sequentially applied nickel and chromium strikes to a total depth of approximately 0.0003". The slip was applied to the prepared copper bar to develop a coating thickness of 0.001" to 0.002" after firing the slip to maturity at 1800° F.

The so-coated copper bar was subjected to four repeated cycles wherein the part was heated to a temperature of 1850° F. for one-half hour and afterwards quenched in tap water at room temperature. The improved non-porous protective coating exhibited no failure with respect to either porosity or adhesion. In addition, the copper part exhibited no corrosion or oxidation due to the air atmosphere in which it was heated. The coating and metal part exhibited no deterioration after exposure to an air-containing environment for 100 hours at 1500° F.

I claim:
1. A ceramic protective coating composition consisting of:
   (a) From 2% to 50% by weight of refractory oxide selected from the group consisting of the oxides of aluminum, cerium, chromium, cobalt, iron, manganese, molybdenum, nickel, niobium, silicon, tin, titanium, and vanadium, and
   (b) The balance a mixture of glass frits which each are fluorine-free and of less than 12% alkali metal oxide content by weight, which each are separately fritted, and which consists on a weight basis of:
      (1) 35 to 80 parts of a first glass frit having a softening temperature in the range of 1100° F. to 1250° F., having a fusion flow value in the range of 7% to 22%, and having a thermal expansion coefficient in the range $3 \times 10^{-6}$ to $5 \times 10^{-6}$ inches per inch per degree Fahrenheit,
      (2) 10 to 15 parts of a second glass frit having a softening temperature in the range of 1100° F. to 1250° F., having a fusion flow value in the range of 38% to 48%, and having a thermal expansion coefficient in the range of $5 \times 10^{-6}$ to $7 \times 10^{-6}$ inches per inch per degree Fahrenheit, and
      (3) 10 to 50 parts of a third glass frit having a softening temperature in the range of 1100° F. to 1250° F., having a fusion flow value in the range of 60% to 75%, and having a thermal expansion coefficient in the range of $7 \times 10^{-6}$ to $10 \times 10^{-6}$ inches per inch per degree Fahrenheit.

2. The ceramic protective coating composition defined by claim 1, wherein said mixture of glass frits consists of: 50 to 80 parts of said first glass frit, 10 to 15 parts of said second glass frit, and 10 to 15 parts of said third glass frit.

3. The ceramic protective coating composition defined by claim 1, wherein said mixture of glass frits consists of: 35 to 40 parts of said first glass frit, 10 to 15 parts of said second glass frit, and 35 to 40 parts of said third glass frit.

4. The ceramic protective coating composition defined by claim 1, wherein said mixture of glass frits consists of: 35 to 40 parts of said first glass frit, 10 to 15 parts of said second glass frit, and 35 to 50 parts of said third glass frit.

5. The ceramic protective coating composition defined by claim 1, wherein there is also included an additive, said additive consisting of 7 to 8 parts by weight of annealed nickel in fine powder form.

6. The ceramic protective coating composition defined by claim 1, wherein said mixture of glass frits consists of: approximately 65 parts of said first glass frit, approximately 12.5 parts of said second glass frit, and approximately 12.5 parts of said third glass frit.

7. The ceramic protective coating composition defined by claim 1, wherein said mixture of glass frits consists of: approximately 37.5 parts of said first glass frit, approximately 12.5 parts of said second glass frit, and approximately 37.5 parts of said third glas frit.

8. The ceramic protective coating defined by claim 2, wherein said refractory oxide contains 8.3% to 17.6% silica.

9. The ceramic protective coating composition defined by claim 3, wherein said refractory oxide contains 11.2% to 18.4% silica.

10. The ceramic protective coating composition defined by claim 4, wherein said refractory oxide consists of titanium dioxide, chromic oxide, and nickel monoxide.

References Cited by the Examiner
UNITED STATES PATENTS

| | | | |
|---|---|---|---|
| 2,391,468 | 12/45 | Long | 106—48 |
| 2,843,507 | 7/58 | Long | 106—48 |
| 2,889,238 | 6/59 | Long et al. | 106—48 |
| 2,900,276 | 8/59 | Long et al. | 106—48 |
| 3,025,188 | 3/62 | Larsh et al. | 106—48 |
| 3,037,828 | 6/62 | Michael | 106—48 |

TOBIAS E. LEVOW, *Primary Examiner.*